Oct. 18, 1955      L. F. H. MANS      2,721,158

POWER TRANSMISSION BELT

Filed Aug. 14, 1950

INVENTOR.
LEONARDUS FRANS HELENE MANS
BY
AGENT

United States Patent Office 2,721,158
Patented Oct. 18, 1955

2,721,158
POWER TRANSMISSION BELT

Leonardus Frans Helene Mans, Eindhoven, Netherlands, assignor to Hartford National Bank and Trust Company, Hartford, Conn., as trustee Application August 14, 1950, Serial No. 179,321

Claims priority, application Netherlands September 24, 1949

3 Claims. (Cl. 154—52.1)

This invention relates to power transmission belts such as driving belts and driving ropes.

It is known to manufacture transmission belts from leather, textile or similar little extensible materials. Furthermore, elastic materials such as rubber and thermoplastic substances have been used for this purpose. In certain cases reinforcements in the form of cores, frequently consisting of textile, are used in the material for the purpose of counteracting troublesome extension, said cores being capable of substantially taking up the mechanical load.

As a rule, for interconnecting the ends of transmission belts, use is made of mechanical means such as metallic belt fasteners, whilst in cases in which the material lends itself for this purpose, the connection may be made by means of an adhesive. Such connections have the disadvantage that the junction is of a different nature from that of the transmission belt itself and this is not conducive to noiseless and smooth running.

Furthermore, endless transmission belts have been made of rubber or thermoplastic material and of textiles impregnated therewith. Endless belts have the disadvantages that they are available only in a limited number of standard dimensions, that any extension occurring upon load has to be compensated by mechanical means, such as guide wheels, and that the belts may become unserviceable as a result of such extension before this would become necessary due to wear.

Transmission belts consisting of thermoplastic materials may readily be connected by thermal welding or by means of an adhesive. Any extension occurring in operation may simply be corrected by shortening and reconnecting. However, the said materials have a limitation in that both the elastic and the permanent extensions are considerable.

The present invention in which the above-mentioned disadvantages are mitigated relates to power transmission belts consisting of a thermo-plastic mass containing one or more cores of little extensible material of high tensile strength, which are capable of substantially taking up the mechanical load, and is characterized in that the said core or cores are secured by adhesion to the thermo-plastic mass so as to be prevented from shifting, the belts being so proportioned that the thermo-plastic mass in itself can withstand the load.

A great variety of thermo-plastic materials may be used for the manufacture of transmission belts, the choice of material being determined substantially by the mechanical properties. For example, plasticized polyvinylchloride and copolymers substantially containing vinylchloride have been found to be highly suitable materials.

For the cores, use may be made of materials such as are used for endless driving ropes, for example textile and metal.

The belts may be manufactured to have any desired section in a simple manner, for example by extrusion round the cores.

The adherence of the cores to the thermo-plastic material may be enhanced by the use of an intermediate layer consisting of a substance which satisfactorily adheres to both the material of the core and to the thermoplastic mass. In the case of cores of textile, a highly satisfactory adherence is obtained by impregnation with such a substance. Dispersions of polyvinylchloride in softening agents, which are known under the name "plastisoles," are particularly suitable for this purpose.

The ends of transmission belts according to the invention may, without objection, be reconnected at any time by thermal welding or by means of an adhesive, since, despite the use of thermo-plastic materials, there is no troublesome extension in operation since the load is substantially taken up by the cores which are not extensible and which cannot shift. True, the junction itself is subject to the full load on the material between the ends of the cores, but this has no detrimental consequences since, on the one hand, the cross-sectional area is chosen to be sufficiently large in connection with the load and, on the other hand, the transmission belt has no core through a very small length only, so that a great specific extension at the junction cannot bring about any appreciable extension of the transmission belt.

In order that the invention may be readily carried into effect, an example will now be described in detail with reference to the accompanying drawings of which:

Figure 1:
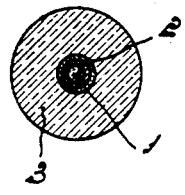
Fig. 1 is a cross-sectional view of a transmission belt.

In the figures, reference numeral 1 indicates a core consisting, for example, of textile impregnated with a dispersion of 1 part of polyvinylchloride in 1 part of dioctylphthalate and thus covered with a thin layer 2 of this material. The core is covered by extrusion with a polyvinylchloride mass 3 containing 40% of dioctylphthalate.

Figure 2:
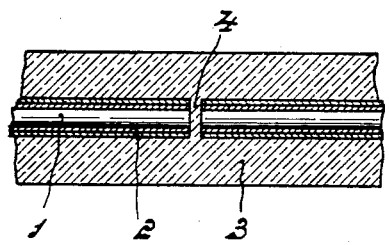
Fig. 2 shows a longitudinal section of a junction between the ends of such a transmission belt obtained by thermal welding.

In Fig. 2, the interruption of the core at the junction is designated 4.

What I claim is:

1. A power transmission belt comprising a textile core, said core being covered by a thermoplastic mass, an intermediate layer between said core and said thermoplastic mass which impregnates and adheres to the core and also adheres to the thermoplastic mass to prevent shifting of said core, said intermediate layer comprising a dispersion of 1 part of polyvinylchloride in 1 part of dioctylphthalate, said belt having ends which are joined together, said core being interrupted at the point of juncture so that the joint is wholly of the thermoplastic mass, the cross-section of said thermoplastic mass being great enough to withstand the load without cooperation of said intermediate layer and said core.

2. A power transmission belt comprising a textile core, said core being covered by a thermoplastic mass of plasticized polyvinylchloride containing 40% of dioctylphthalate, an intermediate layer of polyvinylchloride dispersed in a softening agent between said core and said thermoplastic mass which impregnates and adheres to the core and also adheres to the thermoplastic mass to prevent shifting of said core, said belt having ends which are joined together, said core being interrupted at the point of juncture so that the joint is wholly of the thermoplastic mass, the cross-section of said thermoplastic mass being great enough to withstand the load without cooperation of said intermediate layer and said core.

3. A power transmission belt comprising a core, a thermoplastic mass, an intermediate layer constituted of a polyvinylchloride plastisole positioned between said core and said thermoplastic mass thereby causing said thermoplastic mass to be adhesively secured to said core, said belt having ends which are joined together, and said core being interrupted at the point of juncture so that the joint is wholly of said thermoplastic mass, the cross-section of said thermoplastic mass being great enough to withstand the load without cooperation of said intermediate layer and said core.

References Cited in the file of this patent

UNITED STATES PATENTS

| Number | Name | Date |
|---|---|---|
| 1,610,942 | Gammeter | Dec. 14, 1926 |
| 1,612,024 | Jacobs | Dec. 28, 1926 |
| 1,929,453 | Semon | Oct. 10, 1933 |
| 1,980,437 | Reeves | Nov. 13, 1934 |
| 2,341,019 | Cook | Feb. 8, 1944 |
| 2,536,163 | Field et al. | Jan. 2, 1951 |
| 2,596,513 | Tocci-Guilbert | May 13, 1952 |